United States Patent Office 2,717,900
Patented Sept. 13, 1955

2,717,900

PREPARATION OF ORGANOSILICON COMPOUNDS

Edwin P. Plueddemann and David B. Hatcher, Toledo, Ohio, assignors, by mesne assignments, to Allied Chemical & Dye Corporation, New York, N. Y., a corporation of New York No Drawing. Application April 3, 1950,
Serial No. 153,752

11 Claims. (Cl. 260—410.7)

The invention relates to the modification of oils, and more particularly to the modification of oils in such a manner as to improve the heat resistance of coatings produced from the oils without impairing the resistance of such coatings to hydrolysis.

A hydroxy radical connected to a silicon atom behaves as an acid radical in that it is capable of reacting with an alcoholic hydroxy group connected to a carbon atom, with the elimination of one molecule of water, to form an oxygen linkage between the silicon atom and the carbon atom. This property of a hydroxy radical attached to a silicon atom makes it possible to react such a hydroxy radical with free alcoholic hydroxy groups in the molecules of an oil so as to introduce silicon into the oil molecules. However, an oxygen linkage connecting a carbon atom to a silicon atom tends to hydrolyze upon contact with moisture. Thus, any attempt that has been made heretofore to produce a heat-resistant oil containing silicon atoms in its molecules has yielded an oil having unsatisfactory resistance to hydrolysis.

The principal object of the invention is the production of silicon-containing oils that not only have superior heat resistance but also have superior resistance to hydrolysis, and the production of derivatives of such oils, including varnishes and alkyd resins. More specific objects and advantages are apparent from the description, which illustrates and discloses but is not intended to limit the invention.

The present invention is based upon the discovery that it is possible to prepare a novel type of oil containing organic radicals each of which has at least two carbon atoms and is attached to a silicon atom by a

linkage, and that such type of oil has resistance to hydrolysis that is remarkably superior to that of an oil containing silicon atoms to which only oxygen atoms or methyl radicals are attached.

A modified oil embodying the invention is an ester of components comprising (1) a polyhydric alcohol; and (2) not less than 0.9 mol of fatty acid per mol of polyhydric alcohol; and (3) from 0.9 to 2.1 equivalents of silanol per mol of polyhydric alcohol; the number of fatty acid carboxy groups per molecule of polyhydric alcohol in the components of said ester being from $k-2.1$ to $k-0.9$, $k$ being the number of alcoholic hydroxy groups in said components per molecule of polyhydric alcohol; at least 90 per cent of the carboxy groups in said components being fatty acid carboxy groups; and each organic radical that is attached by a carbon-silicon linkage to a silicon atom having at least two carbon atoms.

In the preferred oils embodying the invention the part of the molecule that is derived from a silanol is connected through a

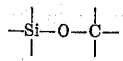

linkage to the part of the molecule that is derived from a polyhydric alcohol, and each fatty acid radical in the molecule is connected by an ester linkage to the part of the molecule that is derived from a polyhydric alcohol.

Although an oil of the invention is defined as an ester of components comprising (1) a polyhydric alcohol, (2) a fatty acid and (3) a silanol, such definition is intended to explain the structure of the oil and is not intended to limit the starting materials from which the oil is prepared or to limit the method of preparation. For example, the first step in the preparation of an oil embodying the invention may consist in reacting a polyhydric alcohol with an ester of a fatty acid and a lower alcohol. In such a reaction the polyhydric alcohol displaces the lower alcohol to form an ester of the polyhydric alcohol and the fatty acid. The latter ester is properly defined as an ester of components comprising a polyhydric alcohol and a fatty acid, even though a free fatty acid was not used in its preparation. Similarly, the silicon-containing substance used in the preparation of an oil of the invention may not be an actual silanol, but may be a substance having alkoxy or halo radicals rather than hydroxy radicals attached to silicon atoms. In the production of an oil from such a substance, the alkoxy or halo radicals are displaced to liberate alcohol or hydrogen halide molecules, and in place of each alkoxy or halo radical there is formed an oxygen linkage connecting a silicon atom to one of the carbon atoms in the part of the molecule that is derived from a polyhydric alcohol.

Although it is possible under some conditions to form an ester of a polyhydric alcohol and a silanol and then to react such ester with a fatty acid, it is usually more convenient to form a partial ester of a fatty acid and a polyhydric alcohol and then to produce an oil of the invention by forming an ester of a silanol with such partial ester. For example, as the first step in the production of an oil embodying the invention, a partial ester may be prepared by reacting a vegetable oil such as linseed oil with a polyhydric alcohol such as glycerol, or by reacting linseed oil fatty acids with an excess of glycerol.

A polyhydric alcohol is a substance whose molecule contains more than one alcoholic hydroxy radical. The term "alcoholic hydroxy radical" is used herein to mean a hydroxy radical which is attached to an aliphatic carbon atom (as distinguished from a phenolic hydroxy radical, which is a hydroxy radical that is attached to a carbon atom contained in an aromatic nucleus). A polyhydric alcohol that is used in the present invention may be (a) a substance whose molecule may be considered to be derived by replacing two or more hydrogen atoms attached to different carbon atoms contained in the molecule of an aliphatic hydrocarbon with hydroxy radicals, or (b) a linear ether of two or more molecules of such a substance. The aliphatic hydrocarbon may be one having from two to twelve carbon atoms, having saturated or unsaturated —C—C— bonds, and having no substituents or having one substituent consisting of a halogen having an atomic weight between 35 and 80 (i. e., chlorine or bromine). Such aliphatic hydrocarbons include straight and branched chain alkanes having from two to twelve carbon atoms (i. e., ethane, propane, butane, isobutane or any alkane having from five to twelve carbon atoms); cycloalkanes having five or six carbon atoms (i. e., cyclopentane or cyclohexane), or mono-, di- or tri-alkyl-substituted cyclopentanes and cyclohexanes in which the alkyl substituent is a primary, secondary or tertiary alkyl radical having from one to six carbon atoms, the total number of carbon atoms in the alkyl substituents being not more than six (i. e., the substituents being: one, two or three methyls or ethyls; one ethyl and one methyl; two methyls and one ethyl; two ethyls and one methyl; either propyl radical; two propyl radicals; either propyl radical and one or two methyls; either propyl radical and ethyl; either propyl radical, one ethyl, and one methyl; any butyl radical; any butyl radical and methyl or ethyl; any butyl radical and two methyls; any pentyl radical; any pentyl radical and methyl; or any hexyl radical); and alkenes having from two to twelve carbon atoms (e. g., ethene, propene, butene, isobutene, or any alkene having from five to twelve carbon atoms).

POLYHYDRIC ALCOHOL

Polyhydric alcohols that may be considered to be derived as described in (a) above include: 1,2-ethanediol, 1,2 - propanediol, 1,3 - butanediol, 2,3 - butanediol, 1,2 - pentanediol, 1,4-pentanediol, 2,4-pentanediol, 3,4-hexanediol, glycerol, pentaerythritol, mannitol, sorbitol, iditol, dulcitol, 1,2,3-butanetriol, 2-butene-1,4-diol, 1,2,5-pentanetriol, 2,3,4-pentanetriol, 2,3,4-trimethyl-2,3,4-pentanetriol, 1,2,6-hexanetriol, 3,4,5-trimethyl-3,4,5-heptanetriol, 1,2,3-trimethylol propane, 3-chloro-1,2-propanediol, 1,3 - cyclohexanediol, 1,4 - cyclohexanediol, 3-chloro-2-methyl-1,2-propanediol, 5-bromo-1,2,6-hexanetriol, and any polymethylene glycol in the series from trimethylene glycol to decylene glycol (e. g., decamethylene glycol).

Polyhydric alcohols described in (b) above include: dipropylene glycol, any polyethylene glycol in the series from diethylene glycol to nonaethylene glycol (e. g., tetraethylene glycol), and any polypentaerythritol.

It is preferred that the polyhydric alcohol used in the practice of the present invention be one which is not halo-substituted, since the presence of a halo-substituent in an aliphatic radical in the molecule of an oil of the invention sometimes decreases the heat stability of the oil.

Although the polyhydric alcohol used in the practice of the present invention may be one whose molecule contains no primary hydroxy radicals (e. g., 2,4-pentanediol), it is preferred that the polyhydric alcohol be one whose molecule contains at least one primary hydroxy radical (e. g., 1,2-propanediol), and it is desirable that it be one whose molecule contains only primary hydroxy radicals (e. g., ethylene glycol). A partial ester derived from a polyhydric alcohol whose molecule contains only primary hydroxy radicals has at least one free primary hydroxy radical per molecule, and such a partial ester reacts more readily with silanols in the production of oils of the invention than a partial ester whose free hydroxy radicals are secondary. Furthermore, the preferred polyhydric alcohols for use in the practice of the invention are those whose molecules contain at least three hydroxy radicals, for oils produced from partial esters derived from such polyhydric alcohols may have higher functionality and better properties, as explained hereinafter. Thus, the most desirable polyhydric alcohols for use in the practice of the invention are those whose molecules contain at least three hydroxy radicals, all of which are primary (e. g., 1,2,3-trimethylol propane and pentaerythritol).

FATTY ACID

A fatty acid that is used in the practice of the invention may be any saturated or unsaturated fatty acid having from two to eighteen carbon atoms, or any such fatty acid that is mono- or di- hydroxy- or mono-, di- or tri-aryl-substituted, the aryl substituents, if any, consisting of radicals having from one to three benzene nuclei containing from six to eighteen carbon atoms (e. g., radicals of the benzene, naphthalene, phenanthrene, diphenyl and terphenyl series), and the total number of carbon atoms in the aryl substituent or substituents being not more than eighteen. Such acids include fatty acids in the series from acetic to stearic and phenylacetic, β-hydroxybutyric, β,γ-dihydroxybutyric, 1-naphthalene-acrylic, acrylic, crotonic, isocrotonic, vinylacetic, methylacrylic, tiglic, angelic, senecioic, sorbic, hydrosorbic, 4-methylene-2-nonenoic, 4-tetrade-cenoic, α-methylene-butyric, α-ethylidene-caproic, propiolic, tetrolic, 3-butynoic, 2,8-decadiene-4,6-diynoic, teracrylic, hypogaeic, oleic, elaidic, pentinoic, amylpropiolic, palmitolic, palmitoleic, linoleic, linolenic, eleostearic, and ricinoleic acids.

Many fatty acids are available commercially as their glycerol esters, which are oils derived from natural sources; examples of oils that provide sources for fatty acids include coconut oil, palm kernel oil, babassu oil, murmuru oil, palm oil, rape seed oil, mustard seed oil, olive oil, peanut oil, sesame oil, corn oil, cottonseed oil, soybean oil, sunflower oil, walnut oil, linseed oil, perilla oil, castor oil, tung oil, oiticica oil, whale oil and menhaden oil. Beef tallow, lard, and sardine and herring oils also are sources of fatty acids.

In the practice of the invention the preferred fatty acids are drying oil fatty acids, i. e., fatty acids whose molecules contain two or three pairs of doubly bonded carbon atoms (e. g., linoleic and linolenic acids). The glycerol esters of these acids are present in drying oils such as linseed oil, tung oil, poppy oil and hempseed oil. The preferred oils of the invention, which are esters of components comprising a polyhydric alcohol, a drying oil fatty acid and a silanol, can be used in the production of air-drying coating compositions. The air-drying of such compositions is caused by the action of oxygen on the double bonds contained in the drying oil fatty acid radicals, unlike the curing of heretofore-known silicon-containing resin coating compositions, in which the mechanism is primarily condensation between hydroxy groups connected to different silicon atoms to form

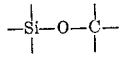

linkages, and in which complete cure takes place only upon baking.

Although oils of the invention may be esters in which both a polyhydric alcohol and a silanol are esterified with a hydroxy-substituted fatty acid, the preferred oils are esters in which both a fatty acid and a silanol are esterified with a polyhydric alcohol. For example, castor oil which comprises essentially triricinolein may be heated with a triglyceride which contains no reactive hydroxy groups (e. g., linseed oil), to obtain, by ester interchange, a product whose molecules contain an average of not more than 2.1 free hydroxy groups, derived from ricinoleic acid, per molecule. Such product may be reacted with silanol in the practice of the invention to obtain an oil in which both the polyhydric alcohol (i. e., glycerol) and the silanol are esterified with a fatty acid (ricinoleic acid). The improvement in the properties of such an oil of the invention produced from an ester of a polyhydric alcohol with a fatty acid in which the reactive groups are derived from the fatty acid, however, is not as marked as the improvement in the properties of an oil of the invention that is derived from a partial ester of a fatty acid with a polyhydric alcohol. Castor oil itself is not satisfactory for the reaction with a polyfunctional silanol in the practice of the invention since its molecule contains three hydroxy groups derived from ricinoleic acid. It is difficult to obtain an oil from the reaction of a polyfunctional silanol with an ester whose molecule contains three reactive groups. In rare instances, by carefully controlling the proportions of such substances, an oil may be obtained, but such an oil is ordinarily unstable and gels within a short time.

In the production of oils of the invention a polyhydric alcohol and a silanol may be reacted first and the resulting ester then reacted with a fatty acid. Such a procedure, however, in many cases is undesirable since the reaction to prepare an ester of a silanol with a polyhydric alcohol is difficult to control. For example, the reaction of a polyfunctional silanol with a polyhydric alcohol such as pentaerythritol ordinarily results in a product which is a gel. Thus, it is most desirable in the practice of the invention to prepare a partial ester of a polyhydric alcohol with a fatty acid first, and then to react the partial ester of these components with the silanol component.

PRELIMINARY PREPARATION OF PARTIAL ESTERS

A partial ester of a fatty acid with a polyhydric alcohol that can be reacted with a silanol to produce oils of the invention may be prepared by reacting one of the fatty acids hereinbefore described (or mixtures thereof), with one of the polyhydric alcohols hereinbefore described (or mixtures thereof), in such proportions that the molecules of the product contain an average of at least 0.9 and not more than 2.1 unesterified alcoholic hydroxy groups. The reaction may be conducted by any of the procedures commonly employed in the preparation of such partial esters. That is, a mixture of a fatty acid and a polyhydric alcohol may be heated to a temperature between about 200 and about 350 degrees C. It is desirable that this heating be carried out in the inert atmosphere (e. g., of nitrogen or carbon dioxide), and the inert gas can conveniently be bubbled through the reaction mixture to effect stirring. The material is maintained at the reaction temperature for a time sufficiently long that the acid number is not higher than 10, and preferably for a time sufficiently long to obtain an acid number below 3; usually the time is not shorter than about four hours, and not longer than about eight hours, varying, of course, with the temperature.

A partial ester for use in the practice of the invention may also be prepared by reacting a fatty acid ester of a polyhydric alcohol (e. g., cottonseed oil, linseed oil, or soybean oil) with the polyhydric alcohol. Such reaction for preparing a partial ester of a fatty acid may be carried out in accordance with any commonly employed procedure for conducting such an exchange reaction. Usually the reaction is conducted under an inert atmosphere in the presence of a catalyst such as calcium naphthenate, the mixture of oil and polyhydric alcohol being heated for approximately three hours at a temperature below about 250 degrees C. (e. g., 230 to 240 degrees C.).

Partial esters which may be used in the practice of the invention include: the alpha- and beta-monoglycerides of saturated fatty acids in the series from acetic to stearic, such as α- and β-monoacetins, α- and β-monobutyrins, α- and β-monocaproins, α- and β-monolaurins, α- and β-monomyristins, α- and β-monopalmitins, α- and β-monostearins, and α- and β-monocarpylins; the monoglycerides of unsaturated fatty acids having from 3 to 18 carbon atoms, such as α-monoolein, α-monoricinolein, coconut oil monoglycerides, linseed oil monoglycerides, and soy bean oil monoglycerides; the fatty acid monoesters of glycols, such as 1,2-ethanediol monoacrylate and 1,2-propanediol monostearate; the diglycerides of fatty acids, such as γ-oleo-α-laurin, γ-oleo-α-myristin, γ-oleo-α-palmitin, γ-lauro-α-stearin, α,β-, and α,α-distearins, γ-capro-α-olein, γ-capri-α-olein, γ-stearo-α-olein, α,β- and α,α-dioleins, linseed and soya oil diglycerides; and the linseed fatty acid di- and triesters of pentaerythritol.

SILANOL

An oil embodying the invention is an ester of components which include a silanol. The term "silanol" is used herein to mean a substance whose molecule contains at least one silicon atom to which at least one hydroxy radical is attached, and to which at least one organic radical is attached by a

linkage. Thus, the term "silanol" includes polymeric silanols or siloxanols, which can be considered to be derived by condensation between hydroxy groups attached to silicon atoms in two or more molecules of monomeric silanols, with the formation of

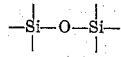

linkages. In the reaction between a silanol and a partial ester (as hereinbefore described) a free hydroxy radical attached to a carbon atom contained in the molecule of the partial ester reacts with a hydroxy radical attached to a silicon atom in the molecule of the silanol, with the formation of a

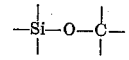

linkage and the liberation of a molecule of water. Silanols which are used in such a reaction can be prepared by hydrolyzing an organosilane whose molecule contains at least one hydrolyzable radical (as hereinafter described). In the hydrolysis of such an organosilane, the reaction of each hydrolyzable radical (Y) is believed to correspond essentially to Equation 1 (below):

(1)
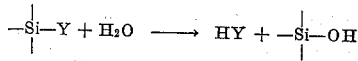

During or immediately after hydrolysis, the hydrolyzed organosilane (monomeric silanol) may undergo condensation, at least to a slight extent, to produce

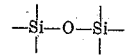

linkages, i. e., siloxane linkages. It is not necessary to isolate the products of the hydrolysis of the organosilane before reacting them with the unesterified hydroxy groups of the partial ester to produce oils of the invention. That is the solution of the hydrolysis products, comprising mixtures of silanols, can be reacted directly with the partial ester. In fact, oils of the invention can be produced by an ester-interchange reaction which does not include the step of hydrolyzing the hydrolyzable organosilane to produce an actual silanol, and such a method of producing oils of the invention is preferred over that method which consists in reacting the hydrolysis products of a hydrolyzable organosilane with a partial ester. The mechanism by which a hydrolyzable organosilane reacts directly with a partial ester is believed to be an ester-interchange reaction between a hydrolyzable group in the molecule of the organosilane and an unesterified OH group in the molecule of the partial ester, with the formation of a

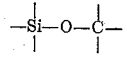

bond, the hydrolyzable radical being released to form a compound whose structure depends upon the particular type of hydrolyzable radical involved. (For example, when the hydrolyzable radical is an alkoxy radical, the compound is an alcohol.) An oil formed by an ester-interchange (or trans-esterification) reaction is considered to be an ester of components comprising a silanol even though an actual silanol is not used in its preparation. Although theoretically an oil prepared from an actual silanol has essentially the same structure as an oil prepared by an ester-interchange reaction, in actual practice it has been found that the reaction to produce the former oil cannot be as readily controlled. There is a tendency for uncondensed

groups in the solution of the hydrolysis products to condense further with one another instead of reacting with the hydroxy groups in the partial ester molecules, so that the resulting composition may contain unreacted partial ester molecules, and oil molecules containing some uncondensed OH groups attached to silicon atoms. In a trans-esterification reaction, hydrolyzable radicals attached to the silicon atoms react with OH groups in the partial ester molecules to form stable molecular structures in which the four valencies of each silicon atom are satisfied by stable radicals or groups.

The hydrolyzable organosilane (one or a mixture of which is used in the production of an oil embodying the invention) may be any substance whose molecule consists of a silicon atom to which are attached four monovalent radicals, from one to three of which are aliphatic radicals, aryl radicals, aralkyl radicals, or alkaryl radicals, having at least two carbon atoms, the remainder of said monovalent radicals being hydrolyzable radicals.

"Aliphatic radical" as used herein means a straight, branched, or closed chain aliphatic hydrocarbon radical having saturated

bonds. A straight or branched chain monovalent aliphatic radical attached to a silicon atom may be a primary or secondary alkyl radical having from two to twelve carbon atoms (i. e., ethyl, propyl, isopropyl, n-butyl, isobutyl, secondary butyl, or any primary or secondary alkyl radical having from 5 to 12 carbon atoms). A closed chain monovalent aliphatic radical attached to a silicon atom may be a cycloalkyl radical having 5 or 6 carbon atoms (i. e., cyclopentyl or cyclohexyl), or a mono-, di- or tri-alkyl-substituted cyclopentyl or cyclohexyl radical, each alkyl substituent being a primary, secondary or tertiary alkyl radical having from one to six carbon atoms, the total number of carbon atoms in the alkyl substituents being not more than six.

"Aryl radical" as used herein means a radical consisting of from one to three benzene nuclei containing from 6 to 18 carbon atoms (e. g., a phenyl, naphthyl, anthracyl, phenanthryl, diphenyl, or terphenyl radical).

"Aralkyl radical" as used herein means a radical consisting of methyl or any aliphatic radical hereinbefore described, in which one hydrogen atom has been replaced by an aromatic radical having from one to three benzene nuclei containing from 6 to 18 carbon atoms (e. g., radicals of the benzene, naphthalene, anthracene, phenanthrene, diphenyl or terphenyl series), having a total of not more than 20 nuclear and side chain carbon atoms, having not more than five side chains, and having no substituents or having from one to five nuclear substituents each of which is a halogen of atomic weight less than 80. Any side chain on the aromatic radical is a monovalent or divalent aliphatic radical containing not more than 6 carbon atoms, the side chains which are closed having from 2 to 6 carbon atoms connected either to one nuclear carbon atom (e. g., cyclohexylphenyl) or to two different nuclear carbon atoms (e. g., acenaphthyl). Such aromatic radicals include phenyl, tolyl, xylyl, ethylphenyl, mesityl, methylethylphenyls, n-propylphenyl, propylphenyl, isopropylphenyl, diethylphenyls, pentamethylphenyl, amylphenyls, butylmethylphenyls, propyldimethylphenyls, propylethylphenyls, ethyltrimethylphenyls, diethylmethylphenyls, hexylphenyl, cyclohexylphenyl, amylmethylphenyl, butylethylphenyl, butyldimethylphenyl, propylethylmethylphenyl, diphenyl, dipropylphenyls, naphthyl, 1-methylnaphthyl, 2-methylnaphthyl, 1-ethylnaphthyl, 2-ethylnaphthyl, phenyl-naphthyl, anthracyl, 9-methyl-anthracyl, 2,3-dimethylanthracyl, 2,4-dimethylanthracyl, 9-ethylanthracyl, bromophenyl, o-bromotolyl, m-bromotolyl, p-bromotolyl, o-chlorotolyl, m-chlorotolyl, p-chlorotolyl, 2-chloro-m-fluorotolyl, 2,6-dichlorotolyl, 4-bromo-o-xylyl, dichloroxylyl, 5-bromo-m-xylyl, 2-bromo-p-xylyl, 2-bromo-mesityl, 3-bromo-o-tolyl, 2-bromo-1-ethylphenyl, 4-bromo-1,3-diethylphenyl, 6-bromo-3-ethyltolyl, 2-bromo-4-ethyltolyl, 4-bromo-1-propylphenyl, 4-bromo-1-isopropylphenyl, 4-bromo-1-methyl-3-isopropylphenyl, 4-bromo-1-tertiary-butylphenyl, 4-bromo-1-tertiary-amylphenyl, chlorophenyl, alpha-bromonaphthyl, beta-bromonaphthyl, 2-chloronaphthyl, 1-bromo-3-chloronaphthyl, 2-chloro-1-methylnaphthyl, 1-bromo-8-methylnaphthyl, 1-bromo-2,3-dimethylnaphthyl, 1 - bromo - 4-methylnaphthyl, 1,10-dibromoanthracyl, 9,10-dichloroanthracyl, phenanthryl, 3-methylphenanthryl, and 1,4-dimethylphenanthryl.

"Alkaryl radical" is used herein to include a mono-, di- or tri-alkyl-substituted phenyl radical in which each substituent is methyl, ethyl, either propyl, any butyl, any pentyl or any hexyl radical so long as the total number of carbon atoms in the alkyl substituents does not exceed 6; the alkaryl radical can also be a mono- or di-methyl-substituted naphthyl or an ethyl-substituted naphthyl radical.

"Hydrolyzable radical" is used herein to mean a halo, alkoxy, amino, aroxy or acyloxy radical, which is as follows: The halo radical is any one having an atomic weight less than 80 (i. e., fluoro, chloro or bromo). The alkoxy radical is any primary or secondary alkoxy radical having from one to four carbon atoms (i. e., methoxy, ethoxy, propoxy, isopropoxy, n-butoxy, isobutoxy, or secondary butoxy). Amino is simply the —NH2 group. The aroxy radical is any in which the aryl group is phenyl, or a mono-, di- or tri-substituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methylphenyl, any di- or tri-methylphenyl, or any substituted phenyl in which the substituents are: one ethyl; one ethyl and one methyl; two ethyls; two methyls and one ethyl; two ethyls and one methyl; either propyl radical; either propyl radical and methyl; either propyl radical and two methyls; either propyl radical and ethyl; any butyl radical; any butyl radical and methyl; or any pentyl radical). The acyloxy radical has the general formula

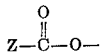

in which Z is a saturated or unsaturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbon atoms, as hereinbefore described.

Examples of silanes that can be used in the production of oils of the invention include ethyltrifluoro- or chloro-, diethyl-dichloro-, n-propyltrifluoro- or chloro-, di-n-propyldichloro-, isopropyltrifluoro-, n-butyltrifluoro- or chloro-, di-n-butyldifluoro-, isobutyltrichloro-, secondary butyltrichloro-, n-pentyltrifluoro- or chloro-, di-n-pentyldifluoro-, 2-methylpentyltrichloro-, 3-(2,2,4-trimethylpentyl)trichloro-, diethyldiethoxy-, ethyltrimethoxy- or ethoxy- or propoxy- or n-butoxy- or isopropoxy-, diethylchloroethoxy-, ethylchlorodiethoxy-, n-propylchlorodifluoro-, n-propylfluorodichloro-, isopropylchlorodifluoro-, isopropylfluorodichloro-, n-butylchlorodifluoro-, n-butylfluorodichloro-, isopentyltrichloro-, n-propyltriethoxy-, isopropyltriethoxy, n-butyltriethoxy-, isobutylchloromethoxyethoxy-, isopentyltriethoxy-, ethyldiethoxyacetoxy-, phenyltrifluoro- or ethoxy- or propoxy- or isobutoxy-, diphenyldifluoro- or chloro- or bromo- or ethoxy- or phenoxy-, ethylphenyldichloro-, ethylbenzyldichloro-, diphenylchlorophenoxy-, phenylbenzyldiethoxy-, benzyltriethoxy-, (2,4-dimethylphenyl)triethoxy-, alpha-naphthyltriethoxy-, beta-naphthyltriethoxy-, cyclohexyltrichloro-, trimethylcyclohexyltrichloro-, p-tertiary-amylcyclohexyltrichloro-, butyltributoxy-, cyclohexyltributoxy-, secondary butyltributoxy-, alpha-(trichlorophenyl)ethyltrichloro-, beta-(trichlorophenyl)ethyltrichloro-, gamma-tolylpropyltrichloro-, gamma-tolylbutyltrichloro-, beta-phenylethyltrichloro-, beta-tolylbutyltrichloro-, beta-tolylpropyltrichloro-, beta-phenylpropyltrichloro-, beta-(chlorophenyl)-ethyltrichloro-, alpha-tolylethyltrichloro-, beta-tolylisobutyltrichloro-silanes, and the like.

When a mixture of hydrolyzable organosilanes is used in the practice of the invention, all of the silanes in the mixture may have the same r/Si ratio, or one or more of the silanes may have an r/Si ratio of 1.0 and one or more other silanes may have an r/Si ratio of 2.0 or 3.0.

("r/Si ratio" is used herein to indicate the total number of non-hydrolyzable radicals attached to silicon atoms in the molecules of the silanes divided by the total number of silicon atoms.) It is usually preferable that the r/Si ratio of the hydrolyzable organosilanes be not higher than about 1.25, although a hydrolyzable organosilane or mixture of silanes having an r/Si ratio as high as about 1.5 can be used. It is usually most desirable to use a mixture of silanes having an r/Si ratio of about 1.0 (i. e., the preferred oils of the invention are those whose molecules contain only one organic radical attached by a carbon-silicon linkage to each silicon atom). In some instances, it may be advantageous to add to the organosilane such a tetrafunctional silicon compound as an alkyl orthosilicate or a silicon tetrahalide (in which the halogens have an atomic weight less than 80); when this is done, the r/Si ratio of the mixture that is reacted may be lower than 1.0. The alkyl orthosilicate can be any one in which the alkyl radical is a primary or secondary alkyl radical having from one to four carbon atoms. It is usually desirable that the r/Si ratio of the mixture be not less than about 0.75, and preferable that it be not less than about 0.8. Most desirably, the r/Si ratio of the mixture is not less than about 0.9. It is desirable that the r/Si ratio of such a mixture be not less than about 0.75 because the

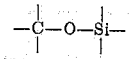

bond is known to hydrolyze readily under certain conditions; it is believed that the presence of organic radicals having at least two carbon atoms, attached directly to the silicon atoms in the molecule of a compound having such a bond stabilizes it against hydrolysis. Thus, oils embodying the invention, which are derived from organosilanes in which the organo radicals have at least two carbon atoms, are more stable toward hydrolysis than the heretofore known silicon-containing oils derived from the tetra-functional silanes, or than oils derived from methyl-substituted silanes. The preferred oils embodying the invention are derived from mono-organosilanes, since such silanes can reach a higher degree of reaction with a partial ester and the oil produced has a higher functionality and better properties.

PREPARATION OF SILICON-CONTAINING OIL

When oils of the invention are produced by reacting a partial ester of a fatty acid and a polyhydric alcohol with a hydrolyzable organosilane (as hereinbefore described), the hydrolyzable radicals are released during the formation of

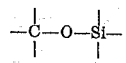

bonds, and alkoxy radicals become alcohols, acyloxy radicals become carboxylic acids, aroxy radicals become phenols, and halo radicals become hydrogen halides. It is usually preferable to conduct the reaction at such a temperature and under such conditions that the by-products are distilled from the oil; therefore, the preferred hydrolyzable radicals are those which form low boiling alcohols and acids, i. e., those boiling at a temperature not higher than about 150 degrees C. Aroxy radicals are usually less desirable than are alkoxy and acyloxy radicals, since their comparatively high boiling temperatures make their complete removal from the oil extremely difficult.

Ordinarily an esterification catalyst such as calcium naphthenate is added to the reaction mixture, usually in an amount not greater than about 1 per cent of the mixture and preferably in an amount not greater than about 0.75 per cent of the mixture; ordinarily it is desirable that calcium naphthenate be used in an amount not smaller than about 0.4 per cent of the mixture, and preferably it is used in an amount not smaller than about 0.6 per cent of the mixture. When the partial ester employed is one that is prepared by an exchange reaction between a fatty acid-containing oil and a polyhydric alcohol, the catalyst ordinarily employed is calcium naphthenate so that such a catalyst can very conveniently be present in the reaction mixture of the partial ester and the hydrolyzable organosilane. Acid catalysts such as hydrochloric acid or sulfuric acid may also be used, but the latter is usually undesirable since its removal from the final product is inconvenient. Chlorosilanes such as silicon tetrachloride and alkyltrichlorosilanes also catalyze the reaction, and are usually used in slightly larger amounts than other catalysts that can be used (e. g., 1 to 2 per cent of the reaction mixture). When the hydrolyzable organosilane starting material itself comprises such chlorosilanes, it is usually desirable at the beginning of the reaction to use an amount of organosilanes slightly less than the amount that would ordinarily be heated with the partial ester, and to add the remainder of the chlorosilanes in small portions at intervals during the reaction.

Usually it is desirable to distill the volatile organic material formed during the heating. When the reactants have low volatility, the heating is conducted using ordinary downward distillation so that the volatile by-products (e. g., alcohol or acid) distill off as they form. It is advantageous to conduct the reaction in an atmosphere of an inert gas such as nitrogen, carbon dioxide or natural gas. A slow stream of such a gas passed over the surface of the reaction mixture, as well as rapid stirring, aids in driving off the volatile organic material as it is formed during the reaction. In general, the reaction may be conducted at a temperature as low as 100 degrees C. but it is preferable that the temperature be at least 140 degrees C. and desirable that it be at least 150 degrees C. The temperature may be as high as desired so long as it is not above the boiling temperature of the organosilane starting material. In general, it is not practical to use a temperature higher than about 300 degrees C. and preferably the temperature is not higher than about 250 degrees C. The time required for the reaction depends upon the temperature, of course, and ordinarily the reaction is conducted until approximately the theoretical amount of the volatile by-product material has distilled from the reaction mixture. When the organosilane is itself low boiling, it may be desirable to conduct the reaction at a low temperature (e. g., about 140 degrees C.) until some of the organic by-product material has distilled, indicating that the organosilane has partially reacted. The reaction can then be conducted at a higher temperature with less danger of the organosilane distilling along with the volatile by-product. It may be convenient to effect the distillation through a reflux condenser when the organosilane is low-boiling, returning the organosilane to the reaction mixture by keeping the temperature at the top of the reflux condenser just above the boiling temperature of the highest-boiling volatile by-product.

As hereinbefore discussed, when a hydrolyzable organosilane is hydrolyzed to a silanol before reacting it with a partial ester in the practice of the invention, the silanol molecules, during or immediately after the hydrolysis, may undergo partial condensation to form siloxanols, i. e., silanols whose molecules contain two or more silicon atoms connected by —Si—O—Si— linkages. For reasons hereinafter explained, such condensation is desirable so long as it can be controlled to prevent the formation of completely condensed silanols which will not, of course, react with a partial ester.

The controlled hydrolysis of hydrolyzable organosilanes to produce silanols (including partially condensed silanols, i. e., siloxanols) that may be used in the production of oils of the invention may be conducted by adding the hydrolyzable silane or mixture of silanes to a hydrolyzing solution. The addition should be made at a rate sufficiently slow that the exothermic hydrolysis reaction does not cause local overheating (i. e., at such a rate that one mol of silane per liter of reaction mixture is added in from about 5 to about 10 minutes). It is usually desirable, also, that the hydrolyzing solution be stirred during the silane addition; otherwise, local overheating may result in spite of a slow rate of silane addition.

The hydrolyzing agent may be water alone or (in the case of less readily hydrolyzed silanes) an aqueous solution of a mineral acid. It is sometimes desirable to use a water solution of a base, such as NaOH or NH4OH, as the hydrolyzing solution. Halosilanes are readily hydrolyzed by water alone, and it is often desirable to hydrolyze them with a water-ice slurry; the hydrolysis produces a hydrohalic acid which then serves as a catalyst for further hydrolysis. Amino, acyloxy, aroxy and alkoxy radicals are progressively more difficult to hydrolyze, and amino radicals are more difficult to hydrolyze than halo radicals. It is usually desirable to use a dilute aqueous solution of a mineral acid as the hydrolyzing agent with silanes having hydrolyzable radicals which consist of amino, acyloxy, or aroxy radicals, although it is possible to hydrolyze these radicals with water alone. Alkoxy radicals are more difficult to hydrolyze than any of the other four so that a more drastic hydrolysis reaction is desirable; the more drastic hydrolysis reaction may be provided by a higher temperature, a stronger aqueous acid solution as the hydrolyzing agent or little or no solvent (for the silanes), which serves as a diluent. The mineral acids that are used as hydrolysis catalysts include hydrochloric, sulfuric and phosphoric, hydrochloric usually being preferred. The amount of hydrolyzing solution that is used includes at least enough water to effect complete hydrolysis of the silanes (i. e., at least one gram mol of water for every two gram atoms of hydrolyzable radicals in the silane to be hydrolyzed). It is usually advantageous to use a considerable excess of water, e. g., from 5 to 10 gram mols for every two gram atoms of hydrolyzable radicals, but it is ordinarily not advantageous to use more than about 20 gram mols of water for every two gram atoms of hydrolyzable radicals. To hydrolyze the more readily hydrolyzable silanes it is often advantageous to effect the hydrolysis at a relatively low temperature. As hereinbefore described this is readily accomplished by supplying the water for the hydrolysis in the form of ice.

It is usually desirable to dissolve the silanes in a solvent. Suitable solvents include ethers such as diethyl, ethylpropyls, dipropyls, propylbutyls, and cyclic ethers such as dioxane; hydrocarbon solvents such as benzene, toluene, xylenes, hexanes, heptanes, and octanes; ketones such as acetone, methylethylketone and diethylketone; and alcohols such as methyl alcohol, ethyl alcohol, propyl alcohols and butyl alcohols. It is usually desirable to conduct the hydrolysis in a two-phase system, i. e., using solvents which dissolve only the silane. Such solvents include the ethers and the higher alcohols. It is usually desirable to use a substantial amount of a solvent or solvents (e. g., from about 100 to about 300 ml. of solvents per gram mol of silane), although in some instances (e. g., when the silane is hydrolyzable only with comparable difficulty) it is desirable to use considerably less solvent, while in still other instances (e. g., when the silane is particularly easy to hydrolyze) it is desirable to use somewhat more solvent.

It has been found that the hydrolysis is usually substantially complete within from about 5 to about 10 minutes after the addition of the silane to the hydrolyzing solution has been completed. Apparently, leaving the silane in contact with the hydrolyzing solution for longer periods of time has no deleterious effect on the resulting products. The silane layer is allowed to separate from the water layer (e. g., in a separatory funnel) and the water layer is drawn off and extracted with a water-immiscible solvent such as diethyl ether. This extract is combined with the silane layer. The separated solution of hydrolyzed silanes is washed with water and dried (e. g., over such a drying agent as anhydrous calcium chloride or anhydrous sodium sulfate). The drying agent is then removed (e. g., by filtration) from the dried solvent solution of the hydrolysis products.

When a hydrolyzable organosilane is hydrolyzed before reacting it with a partial ester to produce an oil of the invention, it is usually preferable to add the dried solvent solution of the hydrolysis products to the partial ester and then to heat in order to effect reaction between the hydrolysis products and the partial ester. When the products of the hydrolysis of a hydrolyzable organosilane or mixture of such silanes are mixed with a partial ester and the resulting mixture is heated, it is believed that water is formed both by condensation of hydroxy groups in the molecules of the partial ester with hydroxy groups attached to silicon atoms (to yield

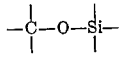

bonds) and by condensation of hydroxy groups connected to different silicon atoms (to yield

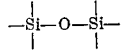

bonds). It is usually desirable to distill the water formed during the heating; it is convenient to accomplish this by effecting the heating under reflux, returning to the oil mixture the material that boils substantially above 100 degrees C. It is frequently advantageous to distill volatile matter other than water during the heating; (when the hydrolysis solvent is diethyl ether, the other volatile matter is the diethyl ether, and this is distilled while the oil mixture is being heated to the reflux temperature).

In the production of oils embodying the invention, the proportion of reactants usually is such that there is at least one equivalent of reactive silanol (or hydrolyzable organosilane) per reactive equivalent of partial ester. An amount of silanol in excess over the equivalent amount required to react with the partial ester may be used. Ordinarily, such an excess of silanol should not be greater than 25 per cent and preferably is not more than 10 per cent. When there is a tendency for the silanol molecules to condense with one another instead of reacting with the free hydroxy groups in the partial ester molecules (which is usually the case when the products of the hydrolysis of a hydrolyzable organosilane are used instead of the hydrolyzable organosilane itself), it is particularly desirable to employ an excess of silanol, and to employ with the excess of silanol a partial ester having only one free hydroxy group per molecule so that the partial ester will be more likely to be completely reacted with the silanol and the product will not be a mixture of slightly substituted silanols dissolved in unreacted partial ester.

In the phrase "an ester of components comprising (1) a polyhydric alcohol; (2) not less than 0.9 mol of fatty acid per mol of polyhydric alcohol; and (3) from 0.9 to 2.1 equivalents of silanol per mol of polyhydric alcohol" as used herein to describe an oil of the invention, the figures 0.9 and 2.1 do not refer to the proportions of reactants used, but refer to the structure of the oil molecules. Thus the foregoing phrase means that the oil molecules contain at least 9 fatty acid residues for every 10 polyhydric alcohol residues. An oil containing any smaller proportion of fatty acid residues would not have satisfactory properties. Similarly, this phrase means that in the oil molecules the sum of the number of

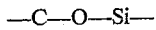

linkages and the number of hydroxy radicals connected to silicon atoms is from 0.9 to 2.1 times the number of polyhydric alcohol residues. If the total number of such linkages and such hydroxy radicals is less than 0.9 times the number of polyhydric alcohol residues in the oil molecules, the oil does not have satisfactory heat resistance; and if it is more than 2.1 times the number of polyhydric alcohol residues, the oil does not have satisfactory stability because it is too highly cross-linked and has a tendency to gel. In order to obtain an oil in whose molecule the total number of such linkages and such hydroxy radicals is not more than 2.1 times the number of polyhydric alcohol residues by reacting an organosilicon compound with a partial ester, it is necessary to use a partial ester whose molecules contain not more than 2.1 alcoholic hydroxy groups per polyhydric alcohol residue. The molecules of an oil embodying the invention may contain a small proportion of polycarboxylic acid residues; however, the equivalents of carboxylic acids in the components of an oil embodying the invention should consist of not more than 10 per cent of polycarboxylic acids and at least 90 per cent of fatty acids. Any greater proportion of polycarboxylic acids would cause the oil to be too highly cross-linked so that the oil would be unstable and would have a tendency to gel.

Starting materials which can attain a high degree of reaction are preferred in the production of oils embodying the invention, for the oils derived from such materials have higher functionality (as evidenced by higher viscosity and higher equivalent weight per residual reactive group). Usually, the greater the complexity of the oil, the more desirable are its properties. For example, the more complex oils (when derived from drying oil fatty acids) are faster drying and can be used to make harder coatings.

The functionality of an oil embodying the invention is greater when the partial ester starting material is derived from a polyhydric alcohol having at least three hydroxy groups than when it is derived from one having only two hydroxy groups. For example, an oil prepared by completely reacting a hydrolyzable organosilane that is tri-functional with a partial ester that is a diester of a glycerol theoretically has a functionality of 6, whereas an oil prepared by reacting the silane with a partial ester that is a monoester of a dihydric alcohol has a functionality of only 3. Similarly, an oil prepared by reacting a triester of pentaerythritol with a tri-functional silane theoretically can have a functionality as high as 9. Thus, the functionailty of oils of the invention may be increased by using polyhydric alcohol starting materials having a greater number of reactive hydroxy groups.

Oils having higher functionality are also obtained by using silanol starting materials whose molecules contain two or more silicon atoms connected by oxygen linkages (e. g., siloxanols). Ordinarily, hydrolysis (and condensation) of a silane or mixture of silanes in which the average number of hydrolyzable groups per silicon atom is approximately three results in cross-linked siloxanes. It would appear, therefore, that the reaction of a partial ester with the products of the hydrolysis and partial condensation of organosilanes having an average of three hydrolyzable radicals per silicon atom might result in a gel rather than an oil of the invention, since there is a tendency for hydroxy groups attached to silicon atoms to condense with one another rather than to react with hydroxy groups in partial ester molecules. It has been found, however, that although some condensation between hydroxy groups attached to silicon atoms does take place, oils rather than gels still can be obtained. This is believed to be due to the fact that silanols whose molecules contain an organic radical having at least two carbon atoms, attached by a carbon-silicon linkage to a silicon atom, tend to form rings or chains of rings upon condensation, instead of the cross-linked three-dimensional molecules that are formed when the organic radical attached to each silicon atom is methyl. When the functionality of the silanol component is controlled (i. e., the r/Si ratio and the excess of silanol over the theoretical amount required to react with a partial ester are within the limits hereinbefore stated), oils of the invention having high functionality can be obtained from actual silanols with little danger of gelation during their production. However, it is usually much more desirable in the production of complex oils of the invention to use an organosiloxane having hydrolyzable groups, attached to silicon atoms, which can react by ester-interchange with hydroxy groups in partial ester molecules, rather than an actual organosiloxanol (just as in the production of less complex oils a hydrolyzable organosilane is preferred over an actual silanol) because the ester-interchange reaction is more readily controllable.

A preferred organosiloxane for use in the practice of the invention, whose molecule contains hydrolyzable groups attached to silicon atoms, has the following empirical formula

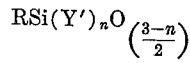

$$RSi(Y')_nO_{\left(\frac{3-n}{2}\right)}$$

wherein $n$ is a number from one-third to two; R is a straight or branched chain aliphatic radical, as hereinbefore described, or an aralkyl radical, as hereinbefore described, in which the aliphatic part of the radical is a straight or branched chain; and Y' is a primary or secondary alkoxy radical having from one to four carbon atoms, as hereinbefore described, or a halogen having an atomic weight less than 80. For the sake of brevity, such organosiloxanes may be hereinafter referred to as alkyl (or aralkyl)-alkoxysiloxanes or alkyl (or aralkyl) halosiloxanes (e. g., when R in the formula given above is an ethyl radical and Y' is an ethoxy or chloro group, the organosiloxane will be referred to as an ethylethoxysiloxane or an ethylchlorosiloxane) although such names, of course, do not identify the actual molecular structure of the compounds and only serve to identify the starting materials from which the compounds are derived.

An organoalkoxysiloxane may be prepared by reacting an alcohol and water simultaneously with an organotrihalosilane, whereas an organohalosiloxane may be prepared by reacting an organotrihalosilane with an amount of water that is insufficient to hydrolyze all the halo groups attached to the silicon atoms.

Theoretically the hydrolysis of the halo radicals in a mol of an organotrihalosilane requires 1½ mols of water (i. e., one molecule of water hydrolyzes two halo radicals). When the proportion of water that is reacted with a trihalosilane is less than 1½ mols per mol of trihalosilane, the halo radicals that are not hydrolyzed by the insufficient quantity of water remain attached to silicon atoms, and the product resulting from the hydrolysis (and condensation) is an organohalosiloxane. However, when a mixture of an alcohol and water in which the quantity of water is less than 1½ mols is reacted with a mol of an organotrihalosilane, the halo radicals that are not hydrolyzed by the insufficient quantity of water react with the alcohol (one molecule of the alcohol reacts with one halo radical) with the evolution of a hydrogen halide. The product so obtained is an organoalkoxysiloxane, whose molecular structure is predominantly a chain, a ring, or a chain of rings, depending upon the proportions of water and alcohol employed. The proportion of water in a mixture of water and an alcohol that is reacted with an organotrihalosilane may be from ½ to 1⅓ mols per mol of silane, and the proportion of the alcohol should be at least sufficient to react with the halo radicals that are not hydrolyzed by the water. Thus, the oxygen atoms which connect the silicon atoms in the molecular structure of the organoalkoxysiloxane that is obtained are derived from the hydrolysis of part of the halo radicals in the trihalosilane starting material, and average from ½ to 1⅓ per silicon atom, depending upon the amount of water that is reacted per mol of trihalosilane. Similarly, the alkoxy radicals that are connected to the silicon atoms are derived from the reaction of the alcohol with the halo radicals in the trihalosilane starting material that are not hydrolyzed by the water, and average from ⅓ to 2 per silicon atom (i. e., $n$ is from ⅓ to 2 in the empirical formula given above) depending upon the amount of water that is reacted per mol of silane.

When $n$ in the empirical formula is less than 1, the molecules of the organosiloxane are believed to consist of rings and chains of rings, the radical

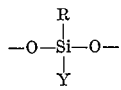

being present both in the rings and in chains connecting the rings. As $n$ decreases and approaches ⅓, the molecular structure is believed to comprise predominantly chains of rings as represented by the following structure (along with some chains of larger rings):

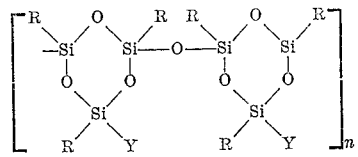

Organoalkoxysiloxanes which may be reacted with a partial ester to produce oils of the invention are obtained by reacting simultaneously water, a monohydric primary or secondary alcohol having from one to four carbon atoms, and alkyl-(or aralkyl)-trihalosilane.

The proportion of an alcohol employed in the preparation of an organosiloxane is at least the theoretical amount required to react with all of the halo radicals that are not hydrolyzed by the water, for example, with the maximum proportion of water, i. e., 1⅓ mols per mol of silane, the proportion of the alcohol is at least ⅓ mol, and with the minimum proportion of water, i. e., ½ mol per mol of silane, the proportion of the alcohol is at least 2 mols. Ordinarily it is preferable to use the alcohol in an excess over the theoretical amount required to produce the desired organosiloxane, since the halo radicals are less reactive with the alcohol than with the water. Although any desired excess of the alcohol over the theoretical amount, e. g., from approximately 25 per cent to approximately 100 per cent, may be employed, it is ordinarily desirable to use about a 50 per cent excess over the theoretical amount of the alcohol.

A mixture of the alcohol and the water is usually added to a solution of the organotrihalosilane (as hereinafter discussed). The rate of addition of the alcohol-water mixture is limited only by the vigor with which the substances react, and so long as hydrogen chloride is not evolved explosively, it may be as rapid as possible. Although the reaction proceeds slowly at room temperature, it is desirable to reflux the mixture (until the evolution of hydrogen chloride ceases) to bring the reaction to completion as rapidly as possible.

Although the proportion of the alcohol in the mixture of the alcohol and the water may be in excess of the theoretical amount required, it is preferable that it be either the theoretical amount or slightly less at the beginning of the reaction, and that the reaction mixture be refluxed for from two to three hours to insure complete reaction of all the water before adding more alcohol (either an amount in excess of the theoretical amount or a quantity sufficient to bring the initial proportion up to the theoretical amount). Preferably, the refluxing is then continued to complete the reaction with the alcohol of all the halo radicals that are not hydrolyzed by the water.

The alcohol and the water should be present in a one-phase system so that they react simultaneously with the organotrihalosilane. When the molar ratio of water to silane is low (e. g., less than 1.2 to 1), the mixture of the alcohol and the water is ordinarily a one-phase system. With higher ratios of water to silane, it is usually desirable to add any inert solvent which is miscible with water and which is not too high boiling to be practical (since it must be separated from the organosiloxane product by distillation), in an amount sufficient to make the alcohol-water mixture a one-phase system. Such inert solvents include: dioxane and dialkyl ethers of diethylene glycol such as the diethyl and dibutyl ethers of diethylene glycol.

The alcohol water-mixture is usually added to a solution of the silane in a solvent. Although the usual solvents for such silanes may be used, e. g., hydrocarbon solvents such as benzene and toluene, it is far more desirable to use a solvent in which the hydrogen halide formed during the reaction is insoluble, so that it can be easily removed before it can exert any undesirable effect (e. g., by reacting with alkoxy groups attached to silicon atoms in the molecules of the organosiloxane). Such a solvent should not be too high boiling, since it must be separated from the organosiloxane product by distillation, and it should be capable of being distilled at atmospheric pressure without appreciable decomposition. Suitable solvents are halo-substituted alkanes having from one to three carbon atoms and having at least three halo-substituents having an atomic weight between 35 and 80 (i. e., chlorine and bromine). Such solvents include: carbon tetrachloride, chloroform, 1,1,2-trichloroethane, 1,1,2,3-tetrachloroethane, pentachloroethane, hexachloroethane, 1,1,2-trichloropropane, 1,2,2-trichloropropane, 1,2,3-trichloropropane, carbon tetrabromide, bromoform, 1,1,1-tribromoethane, 1,1,2-tribromoethane, and 1,2-dibromo-1,2-dichloroethane. Carbon tetrachloride is a most desirable solvent since it is readily available, and a hydrogen halide, e. g., hydrogen chloride, has very low solubility in it. The hydrogen chloride is expelled in the anhydrous form as soon as it is formed, and may be collected and reused, for example, in the preparation of silicochloroform.

Since the alcohol acts as a solvent for the hydrogen halide, the volume of solvent for the silanes preferably is at least equal to the volume of alcohol and may be as large as is economically feasible. Ordinarily it is desirable to use approximately 200 grams of solvent per mol of silane.

Alkylhalosiloxanes are prepared by a procedure that is the same as the procedure hereinbefore described except that the alcohol is omitted. The liquid organosiloxanes are obtained from the reaction mixture by distillation after removal of excess solvent.

As hereinbefore stated, oils embodying the invention are esters whose molecules may comprise closed rings or chains of rings as well as straight or branched chains. Oils of the invention prepared by reacting an organosiloxane having halo or alkoxy groups attached to silicon atoms with a partial ester (by the procedure hereinbefore described for conducting an ester-interchange reaction between a hydrolyzable organosilane and a partial ester) have complex structures and high functionality. For example, an oil consisting of diglyceride (or pentaerythritol triester) derivatives of an organosiloxane having a chain configuration might have the structure represented by the following formula:

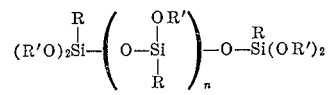

wherein R is an organic radical having at least two carbon atoms, as hereinbefore defined, and R′ is derived from a diglyceride molecule or a pentaerythritol triester molecule. When R′ is derived from a diglyceride, the functionality of the oil is $2n+8$, whereas when R′ is derived from a pentaerythritol triester, the functionality is $3n+12$.

When the molecular structure of an organosiloxane that is reacted with a partial ester in the practice of the invention comprises chains of rings, the resulting oil may have approximately the structure represented by the following formula:

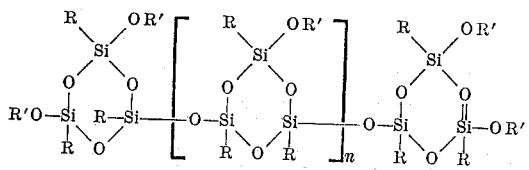

When R' is derived from a diglyceride, the functionality of the oil represented by the above formula is $2n+8$, whereas when R' is derived from a pentaerythritol triester, the functionality is $3n+12$. Oils having the structures represented above are often highly viscous liquids, in contrast to the low-viscosity condensation products of partial esters with low molecular weight organosiloxanes whose structures are simple rings (such as six-membered rings), rather than chains of rings. In general, oils produced from alkylalkoxy-siloxanes have better color, and those from alkylhalosiloxanes have higher viscosities and dry more rapidly.

PROPERTIES OF THE OILS

Although oils of the invention which are derivatives of monomeric silanols or monomeric hydrolyzable organosilanes possess good stability toward hydrolysis, alkalis and heat, the more complex oils of the invention which are derivatives of organosiloxanes ordinarily have even more desirable properties. When the latter oils contain unsaturated fatty acid radicals, they resemble the corresponding bodied drying oils (which are not silicon-modified) in appearance, but their rate of drying, and the hardness of the dry films, as well as their alkali resistance, is better than that of the unmodified oils. Complex oils of the invention whose molecules contain saturated fatty acid radicals are stable non-drying oils that not only are resistant to hydrolysis but also withstand prolonged heating at elevated temperatures without gelation or resinification. They are useful for dash pot oils, instrument oils, damping fluids, hydraulic fluids, etc. The complex oils of the invention which are derivatives of low-cost fatty acids, for example, soya fatty acids, have sufficiently good properties so that in many cases they may be used in place of the more expensive linseed or tung oils. Oils of the invention are useful also as plasticizers.

The superiority in stability toward hydrolysis of heat-resistant oils embodying the invention over the heretofore known silicon-modified heat-resistant oils whose molecules contain no organic radical connected to a silicon atom through a —Si—C— bond is demonstrated by tests carried out as follows:

A partial ester of a fatty acid and a polyhydric alcohol is prepared by the following procedure: Pentaerythritol (91 grams) and linseed fatty acid (468 grams) are mixed in a flask fitted with a condenser, and an inlet tube through which a moderate stream of carbon dioxide is passed over the surface of the reaction mixture. The mixture is heated at about 220 degrees C. for approximately two hours. The heating is then continued at temperatures ranging between 250 and 270 degrees C. for about seven hours longer to obtain a partial ester with a final acid number of 1.3.

A partial ester (0.8 mol of the partial ester of pentaerythritol with linseed fatty acid, prepared as described in the preceding paragraph) and ethyltrichlorosilane (⅓ mol) are mixed in a 2 liter three-necked flask fitted with a thermometer, a stirrer, and a condenser, and the mixture is heated to a temperature of about 250 degrees C. over a period of one-half hour. The heating is continued at that temperature for one hour longer. Hydrogen chloride is evolved during the heating, and the reaction is considered to be essentially complete when the evolution of hydrogen chloride ceases. The material remaining in the flask is an oil of the invention, hereinafter referred to as oil A.

An oil is prepared by reacting a partial ester (0.8 mol of the partial ester of pentaerythritol with linseed fatty acid, prepared as described above) with ethyl orthosilicate (0.25 mol) using the apparatus and procedure described in the preceding paragraph, ethyl alcohol being distilled during the reaction. The material remaining in the flask is hereinafter referred to as oil B.

Samples of oil A (an oil of the invention) and oil B (the control) are each mixed with a drying catalyst consisting of lead naphthenate (0.5 per cent lead based on the weight of the oil) and cobalt naphthenate (0.05 per cent cobalt based on the weight of the oil), then filmed on a glass plate, and allowed to dry at room temperature. For the sake of further comparison of oils of the invention with heretofore known oils, films of linseed oil (which had been bodied to a Gardner-Holdt viscosity of "Q," i. e., measured by the standard Gardner-Holdt bubble viscometer method) are prepared in a similar manner. Oil A dries in about two hours; oil B, in about three hours; and Q-bodied linseed oil in six to eight hours. Films of the three oils are baked at 125 degrees C. for two hours. The films are then immersed in water that is maintained at a temperature of 100 degrees C., and are examined periodically to determine their resistance to hydrolysis. The results of the tests are shown in Table I.

*Table I*

| Oil Sample | Resistance to boiling water |
|---|---|
| A | softened in three hours, but recovered on standing. |
| B | destroyed in three hours. |
| Q-bodied linseed | destroyed in one hour. |

As the results in Table I indicate, an oil embodying the invention (oil A) has much better resistance to hydrolysis than a heretofore known silicon-modified oil (oil B) whose molecules contain no organic radical attached to a silicon atom by a

linkage. Moreover, oils of the invention derived from drying oil fatty acids are much more resistant to hydrolysis than the corresponding unmodified bodied drying oils.

The superiority in alkali resistance of oils of the invention derived from organosiloxanes over the heretofore known silicon-modified heat-resistant oils is demonstrated by the following tests:

A partial ester is prepared by an exchange reaction according to the following procedure:

"Superb" linseed oil (0.4 mol of high grade linseed oil), glycerol (0.2 mol), and a catalyst (3 grams of a solution consisting of 5 per cent calcium naphthenate and 95 per cent Varnolene) are mixed in a flask fitted with a condenser, and an inlet tube through which a moderate stream of carbon dioxide is passed over the surface of the reaction mixture. The mixture is heated at temperatures ranging between 230 and 240 degrees C. for about three hours. The product comprises diglycerides of linseed fatty acids.

A partial ester (1 mol of the partial ester prepared as described in the preceding paragraph) and ethyl orthosilicate (0.25 mol) are mixed in a 2 liter three-necked flask fitted with a thermometer, a stirrer, a condenser, and an inlet tube through which a moderate stream of carbon dioxide is passed over the surface of the mixture. The mixture is heated slowly to a temperature of approximately 250 degrees C. and is held at that temperature for one hour with stirring. Ethyl alcohol is removed by distillation during the heating. The material remaining in the flask is an oil having a viscosity of "A"–"B" (Gardner-Holdt) and is a control hereinafter referred to as oil C.

The procedure described in the preceding paragraph is repeated except that ethyltriethoxysilane (⅓ mol) is used in place of ethyl orthosilicate, and the mixture is held at about 250 degrees C. for about one and one-half hours. The oil so obtained is an oil of the invention having a viscosity of "C" (Gardner-Holdt), and is hereinafter referred to as oil D.

An organosiloxane is prepared by the following procedure:

Ethyltrichlorosilane (164 grams) is dissolved in a solvent (200 cc. of carbon tetrachloride), and to this solution, is a 2 liter three-neck flask fitted with a stirrer, a reflux condenser and a dropping funnel, a mixture of water (18 grams) and dioxane (10 ml.) is added dropwise with stirring over a period of about two hours. The mixture is refluxed until the evolution of hydrogen chloride ceases. Carbon tetrachloride is distilled from the mixture. The residual material is an ethylchlorosiloxane.

A partial ester (616 grams of the linseed mixture of diglycerides prepared as described above) is mixed and heated with an organosiloxane (109 grams of the ethylchlorosiloxane prepared as described in the preceding paragraph), using the apparatus and the procedure hereinbefore described in the preparation of oil C. Hydrogen chloride is evolved during the heating. The material remaining in the flask is an oil of the invention having a viscosity of "G" (Gardner-Holdt) and a color of 10 (measured by the standard Gardner-Holdt method for measuring color). This oil is hereinafter referred to as oil E.

An organosiloxane is prepared by the following procedure:

Ethyltrichlorosilane (164 grams) is dissolved in a solvent (200 cc. of carbon tetrachloride), and to this solution, in a 2 liter three-necked flask fitted with a stirrer, a dropping funnel and a reflux condenser, a mixture of ethyl alcohol (50 grams) and water (18 grams) is added dropwise with stirring over a period of about two hours. The mixture is refluxed until the evolution of hydrogen chloride ceases. Carbon tetrachloride and excess ethyl alcohol are distilled from the mixture, and the residual material is an ethylethoxysiloxane.

A partial ester (616 grams of the mixture of linseed diglycerides prepared as described above) and a catalyst (2 grams of a solution consisting of 5 per cent calcium naphthenate and 95 per cent Varnolene) are mixed with organosiloxane (118 grams of the ethylethoxysiloxane prepared as described in the preceding paragraph). Using the apparatus and procedure described in the preparation of oil C, the mixture is heated to a temperature of about 250 degrees C. and held at that temperature for approximately two hours with rapid stirring. The material remaining in the flask is an oil of the invention having a viscosity of "F" (Gardner-Holdt) and a color of 11 (Gardner-Holdt), and is hereinafter referred to as oil F.

Samples of oils C, D, E and F are each mixed with a drying catalyst consisting of lead naphthenate (0.5 per cent lead based on the weight of the oil) and cobalt naphthenate (0.05 per cent cobalt based on the weight of the oil), filmed on the exteriors of test tubes, and dried in air at room temperature. The test tubes are then immersed in 0.5 normal sodium hydroxide. The length of time required for the films to loosen, and to dissolve completely is recorded in Table II. For the sake of comparison, the results of similar tests using an unmodified bodied drying oil (Q-bodied linseed oil) are also included in Table II.

Table II

| Oil Sample | Time required for film to loosen (min.) | Time required for film to dissolve (min.) |
|---|---|---|
| Q-bodied linseed | 10 | 20 |
| C | 10 | 20 |
| D | 10 | 20 |
| E | 45 | 75 |
| F | 45 | 75 |

As hereinbefore demonstrated, oils of the invention derived from simple hydrolyzable organosilanes have greater resistance to hydrolysis than both the heretofore known silicon-modified heat resistant oils and unmodified bodied drying oils. As the results in Table II indicate, there is no marked difference between the alkali resistance of such an oil of the invention (oil D) and that of heretofore known oils (oil C and Q-bodied linseed oil). However, the more complex oils embodying the invention, such as those derived from organohalo (or alkoxy) siloxanes (oils E and F), are greatly superior in alkali resistance to bodied drying oils and silicon-modified drying oils herefore known, as well as to oils of the invention derived from monomeric silanes.

PRODUCTION OF VARNISHES FROM THE OILS

Oils embodying the invention have sufficiently good thermal stability so that they may be held at temperatures as high as 320 degrees C. for as long as two hours without decomposition. When derived from drying oil fatty acids, they can be bodied in the presence of varnish resins to produce varnishes that dry rapidly to form hard, clear films. In general, drying oils of the invention can be bodied in the presence of any resin that is employed with ordinary drying oils to produce varnishes, i. e., any hard resin that is soluble in the oil and remains compatible during heating with the oil. Such hard resins include natural resins, such as copals, and synthetic resins such as pure phenolic resins, phenol-and maleic-modified ester gum resins, coumarone-indene resins, and glycerol-maleic anhydride adduct resins.

The procedure for bodying drying oils of the invention in the presence of such hard resins to produce varnishes embodying the invention is the same as that ordinarily used in the art of making varnishes. For example, one part of the oil and from about .15 to about 2.5 parts of the resin are heated until cooled drops of the varnish when pulled from a glass plate form a three-foot "string." The time required to body the oil in the presence of a resin to produce a varnish depends upon the temperature and the specific oil employed, but in general the time at a given temperature is approximately the same for an oil of the invention as it is for a corresponding unmodified oil (e. g., approximately two hours at 300 degrees C. for oils of the invention derived from linseed diglycerides, corresponding to the time required to body linseed oil, or one hour at 300 degrees C. for the oils derived from dehydrated ricinolein, corresponding to the time required to body dehydrated caster oil). The more complex oils of the invention body more rapidly than those having lower functionality. After cooling the resin, a solvent (e. g., a petroleum solvent such as "Varnolene") is usually added to dilute it to about a 50 per cent solids concentration, the viscosity of the final resin being within the range "D"–"G" (Gardner-Holdt).

PRODUCTION OF ALKYDS FROM THE OILS

A modified alkyd resin embodying the invention is an ester of components comprising (a) an oil of the invention whose molecule contains at least one unesterified alcoholic hydroxy group and (b) a polycarboxylic acid. Such alkyd resins have all the good properties of other long oil length alkyd resins, and produce coatings that are harder, more resistant to alkalies, more resistant to water and outdoor weathering and more resistant to heat than coatings produced from ordinary alkyd resins.

A modified alkyd resin embodying the invention has a molecular structure that is quite different from that of any silicon-containing alkyd resin heretofore known. In the molecule of a modified alkyd resin embodying the invention, the silanol residues are very well distributed throughout the molecular structure, whereas the molecular structure of any silicon-containing alkyd resin heretofore known is formed by the linking of relatively large silicone molecules to relatively large alkyd resin molecules. In the present alkyd resins the silanol residues, being much better distributed throughout each resin molecule than heretofore, produce a more effective improvement in the properties of the resin than has been produced heretofore by silicone-modification of an alkyd resin. In addition, the composition of the present alkyd resins is different from the composition of previous silicon-containing alkyd resins in that the present alkyd resins contain a higher proportion of silanol residues and fatty acid residues and a lower proportion of polycarboxylic acid residues than the alkyd resins heretofore known. In the molecular structure of the present alkyd resins the polycarboxylic acid residues, which are present in relatively minor proportions, serve merely as cross-links.

In the production of the present alkyd resins, the polycarboxylic acid is reacted with the oil molecules to cross-link such molecules and thereby form a resin from the oil. The proportion of polycarboxylic acid which actually reacts with the oil in the production of an alkyd resin embodying the invention may range from 0.2 to 1.2 equivalents of polycarboxylic acid for each mol of polyhydric alcohol that was actually reacted in the production of the oil; i. e., the production of polycarboxylic acid which actually reacts is such as to provide from 0.2 to 1.2 carboxy groups for each polyhydric alcohol residue in the oil.

In general, an alkyd resin is produced by a reaction that involves two hydroxy groups, one of which is an alcoholic hydroxy radical, and the other of which is the hydroxy group in a carboxylic acid radical. The most frequently used polycarboxylic acid in the production of alkyd resins is an aromatic dicarboxylic acid (either alone or in admixture with other polycarboxylic acids). (The term "aromatic dicarboxylic acid" is used herein to include any aromatic dicarboxylic acid that is unsubstituted and has from 8 to 12 carbon atoms, or that is substituted with from one to four substituents, each of which is a halo or is an alkyl radical that is primary, secondary or tertiary and has from one to five carbon atoms.) Examples of aromatic dicarboxylic acids include phthalic acid, isophthalic acid, terephthalic acid, naphthalic acid, 4-chloro-phthalic acid and tetra-chloro-phthalic acid. Ordinarily, it is most desirable to use phthalic acid as the polycarboxylic acid, because it is the most readily available and the least expensive of the preferred acids that are available in pure form. When it is desired to produce a resin that is comparatively inexpensive, color not being of critical importance, it may be desirable to use abietic acid, usually in the form of dry-distilled rosin, in addition to the polycarboxylic acid. Further if a flame-resistant resin is desired, one of the chloro-substituted phthalic acids may be advantageous. Any dicarboxylic acid, monocarboxylic aromatic acid such as benzoic acid, or monocarboxylic aliphatic acid having a comparatively high boiling point, (e. g., butyric, valeric, caproic or enanthic acid), may be used in the preparation of an alkyd resin of the invention in place of part of the aromatic dicarboxylic acid.

Oils used in the preparation of modified alkyd resins embodying the invention are those prepared by reacting a partial ester (alone or in admixture with other esters) whose molecule has two unesterified hydroxy groups, (e. g., a monoglyceride such as coconut or linseed oil monoglyceride, α- or β-monolein, α- or β-monostearin; or a diester of pentaerythritol) with a silanol (or hydrolyzable organosilane) in such proportions that the molecule of the resulting oil contains at least one free alcoholic hydroxy group. Such an oil may then be reacted with a polycarboxylic acid to obtain a modified alkyd resin. Commercially useful alkyds are derived from compositions comprising an excess of from about 2 to about 40 per cent of OH groups derived from alcohol radicals in the oil molecules over OH groups derived from carboxylic acids. This excess is used in order to obtain an alkyd resin having a comparatively low acid number without the necessity for an unduly protracted reaction time, or the use of a modifying agent such as aniline or toluidine. Alkyd resins with comparatively low acid numbers (usually not higher than about 5) are desirable because they do not react with the pigments ordinarily employed; an alkyd resin with a high acid number may also be unsuited for use with nitrocellulose. (An acid anhydride is herein considered to have the same number of carboxylic OH groups per molecule as the corresponding acid.)

The reaction is usually effected by heating the mixture of reactants under an inert atmosphere to a temperature between about 200 degrees C. and about 300 degrees C. The material is maintained at a temperature within this range until the acid number and viscosity are within the desired range, usually for a time not longer than about five hours and not shorter than about two hours. The time should be sufficiently long that the acid number is not higher than 5, and the time may be sufficiently long to give an acid number as low as 1. The viscosity of the finished resin is also controlled by varying the reaction time, i. e., a longer reaction time yields a more viscous resin.

When the modified alkyd resin has been reacted to the requisite extent, it is cooled and diluted to a concentration of approximately 50 to 75 per cent solids (preferably 55 to 65 per cent solids) with any solvent ordinarily used with alkyd resins. The solvent may be a hydrocarbon solvent such as xylene, toluene, a petroleum solvent, (e. g., Varnolene) or an aliphatic hydrocarbon such as a heptane or an octane. Other solvents, for example, higher alcohols of the aliphatic series (e. g., butanols and higher) or higher boiling ethers (e. g., dibutyl ethers, propyl butyl ethers and higher) can be used, but it is usually preferred that the solvent be a simple hydrocarbon.

The following examples illustrate the practice of the invention:

EXAMPLE 1

An oil of the invention is prepared by the following procedure: A hydrolyzable organosilane is prepared as follows: Methyl alcohol (115 grams) is added slowly with stirring to a solution of cyclohexyltrichlorosilane (218 grams) in carbon tetrachloride (200 cc.) at room temperature. After the addition is complete, the mixture is refluxed for approximately two hours with stirring. The mixture is then placed in a flask containing anhydrous sodium carbonate (10 grams) and distilled to obtain cyclohexyltrimethoxysilane (155 grams), B. P. 200 to 210 degrees C. at 760 mm. Hg (i. e., boiling within the range from 200 to 210 degrees C. at an absolute pressure equal to 760 mm. Hg.).

A partial ester (1 mol of the linseed diglyceride mixture prepared by an exchange reaction between glycerol and "Superb" linseed oil as hereinbefore described) and a hydrolyzable organosilane (⅓ mol of cyclohexyltrimethoxysilane) are mixed and heated in a 2 liter three-necked flask fitted with a thermometer, a stirrer, a condenser, and an inlet tube through which a moderate stream of carbon dioxide is passed over the mixture in the flask. The temperature is allowed to rise to 250 degrees C. in about one-half hour, and the heating is then continued at about 250 degrees C. for an additional one-half hour, with stirring, methyl alcohol (35 cc.) being distilled during the reaction. The material remaining in the flask is an oil having a viscosity of "E" (Gardner-Holdt). When a sample of the oil is mixed with a drying catalyst consisting of lead and cobalt naphthenates and filmed on a glass plate, as hereinbefore described, the oil film dries in about four hours. After standing for approximately five days at room temperature, the film has a Sward hardness of 2 (measured by the standard Sward rocker method).

EXAMPLE 2

Butyl alcohol (3.3 mols) is added slowly to a solution of cyclohexyltrichlorosilane (1 mol) in chloroform (3.5 mols), at room temperature. As hydrogen chloride is evolved the temperature drops spontaneously to about 10 degrees C. After the addition is complete, the mixture is refluxed for approximately three and one-half hours with stirring. The mixture is then placed in a flask containing anhydrous sodium carbonate (10 grams) and distilled to obtain cyclohexyltributoxysilane, B. P. 175–185 degrees C. at 10 mm. Hg; index of refraction at 30 degrees C. ($n_D^{30°}$) 1.437; specific gravity, i. e., density at 30 degrees C. compared with that of water at 4 degrees C. ($d_4^{30}$) .909.

A partial ester (0.8 mol of the partial ester of pentaerythritol with linseed fatty acid, having an acid number of 1.3, prepared as hereinbefore described) is mixed with a hydrolyzable organosilane (⅓ mol of cyclohexyltributoxysilane). The mixture is heated, using the apparatus and procedure described in the second paragraph of Example 1, butyl alcohol being distilled during the reaction. The material remaining in the flask is an oil having a viscosity of "H" (Gardner-Holdt). A sample of the oil, when mixed with lead and cobalt naphthenates and filmed on a glass plate, as hereinbefore described, dries in about five hours.

EXAMPLE 3

Cyclohexyltriethoxysilane (⅓ mol, prepared by reacting cyclohexyltrichlorosilane with ethyl alcohol according to the procedure described in the first paragraph of Example 2) is mixed and heated with a partial ester (0.8 mol of the pentaerythritol-linseed fatty acid ester described in Example 2), using the apparatus described in the second paragraph of Example 1. The mixture is heated slowly so that the temperature is approximately 200 degrees C. after a period of one hour. The heating is continued for about one and one-half hours longer, during which time the temperature is rapidly brought to and then maintained at approximately 250 degrees C. A distillate of ethyl alcohol (50 cc.) is collected in the receiver during the reaction. The material remaining in the flask is an oil having a viscosity of "Q" (Gardner-Holdt). A sample of the oil, when mixed with lead and cobalt naphthenates and filmed on a glass plate, as hereinbefore described, dries in about four hours. After standing for approximately five days at room temperature the film has a Sward hardness of 5.

EXAMPLE 4

The procedure described in Example 3 is repeated, except that cyclohexyltrichlorosilane (2 grams) is added after one hour of heating at 250 degrees C. The oil so obtained has a viscosity of "I" (Gardner-Holdt). A sample of the oil, when mixed with lead and cobalt naphthenates and filmed on a glass plate, as hereinbefore described, dries in about two hours.

EXAMPLE 5

An organosiloxane is prepared by the following procedure: Ethyltrichlorosilane (656 grams) is dissolved in a solvent (400 cc. of carbon tetrachloride) in a 2 liter three-necked flask fitted with a stirrer, a reflux condenser, and a dropping funnel. To this solution a mixture of methanol (160 grams) and water (54 grams) is added from the dropping funnel over a period of about two hours with stirring. The mixture is then heated at a temperature of 200 degrees C. under reduced pressure (200 mm. Hg) until the evolution of hydrogen chloride ceases. Carbon tetrachloride and excess methanol are distilled from the mixture. The organosiloxane remaining in the flask weighs 350 grams.

Dehydrated castor oil (660 grams), pentaerythritol (51 grams of the pure grade alcohol), and a catalyst (3 grams of a solution consisting of 5 per cent calcium naphthenate and 95 per cent Varnolene) are mixed in a flask fitted with a condenser, and an inlet tube through which a moderate stream of carbon dioxide is passed over the surface of the reaction mixture. The mixture is heated at a temperature of about 250 degrees C. for thirty minutes with stirring. The partial ester so obtained is cooled and mixed with an organosiloxane (156 grams of the ethylmethoxysiloxane prepared as described in the preceding paragraph). Using the apparatus described in the second paragraph of Example 1, the mixture is heated at a temperature of 250 degrees C. for thirty minutes with rapid stirring. Methyl alcohol (50 cc.) is collected in the receiver during the heating. The material remaining in the flask is filtered. The filtrate is an oil having a viscosity of $Z_1$ (Gardner-Holdt) and a color of 7 (Gardner-Holdt).

EXAMPLE 6

Using the apparatus described in the second paragraph of Example 5, a mixture of coconut oil (440 grams), pentaerythritol (34 grams), and a catalyst (2 grams of a solution consisting of 5 per cent calcium naphthenate and 95 per cent Varnolene) is heated at temperatures ranging between 230 and 250 degrees C. for about two hours with stirring. The partial ester formed (474 grams) is cooled and mixed with an organosiloxane (124 grams of the ethylethoxysiloxane prepared as hereinbefore described). Using the apparatus described in the second paragraph of Example 1, the mixture is heated at a temperature of 220 degrees C. for one hour with rapid stirring. A slow stream of natural gas is passed over the surface of the mixture throughout the heating, and ethyl alcohol (42 grams) is collected in the receiver. The material remaining in the flask is filtered. The filtrate is a clear oil having a viscosity of "G" (Gardner-Holdt) and a color of 5 (Gardner-Holdt). When a sample of the oil is heated for one and one-half hours at 300 degrees C., there is no noticeable change in color.

EXAMPLE 7

Using the apparatus and procedure described in the first paragraph of Example 5, ethyltrichlorosilane (164 grams) is dissolved in a solvent (200 cc. of carbon tetrachloride) and to this solution a mixture of water (18 grams) and dioxane (10 ml.) is added dropwise with stirring over a period of about two hours. The mixture is then heated at about 200 degrees C. under reduced pressure (200 mm. Hg) until the evolution of hydrogen chloride ceases. Carbon tetrachloride is distilled from the mixture leaving a residue comprising an ethylchlorosiloxane.

A partial ester (675 grams of the pentaerythritol-linseed fatty acid partial ester whose preparation is described in the second paragraph of Example 2) is mixed with an organosiloxane (109 grams of the ethylchlorosiloxane prepared as described in the preceding paragraph). Using the apparatus and procedure described in the second paragraph of Example 1, the mixture is heated to a temperature of about 250 degrees C. and held at 250 degrees C. for approximately one hour with rapid stirring. The oil so obtained has a viscosity of "S" (Gardner-Holdt) and a color of 16 (Gardner-Holdt). When a sample of the oil is mixed with lead and cobalt naphthenates and filmed on a glass plate, as hereinbefore described, the oil film dried in about two hours and has a Sward hardness of 6.

EXAMPLE 8

An ethylchlorosiloxane is prepared by a procedure which is the same as that described in the first paragraph of Example 7 except that the amount of water used is 19.8 grams.

(a) A partial ester (616 grams of a mixture of linseed diglycerides, prepared as described in the second paragraph of Example 1) is mixed with an organosiloxane (92.7 grams of the ethylchlorosiloxane prepared as described in the preceding paragraph). Using the apparatus and procedure described in the second paragraph of Example 1, the mixture is heated to a temperature of about 250 degrees C. and held at 250 degrees C. for approximately one hour with rapid stirring. The oil so obtained has a viscosity of "G" (Gardner-Holdt) and a color of 14 (Gardner-Holdt). A sample of the oil, when mixed with lead and cobalt naphthenates and filmed on a glass plate, as hereinbefore described, dries in about two and one-half hours. After standing approximately five days at room temperature, the film has a Sward hardness of 4.

(b) The procedure described in (a) above is repeated except that the amount of the ethylchlorosiloxane used is 113.3 grams. The resulting oil has a color of 15 (Gardner-Holdt). A film of the oil dries in about two hours and has a Sward hardness of 4.

EXAMPLE 9

(a) Using the apparatus and procedure described in the second paragraph of Example 1, a mixture of a partial ester (616 grams of a mixture of linseed diglycerides, prepared as described in the second paragraph of Example 1), a catalyst (2 grams of a solution consisting of 5 per cent calcium naphthenate and 95 per cent Varnolene), and an organosiloxane (153.4 grams of the ethylethoxysiloxane prepared as hereinbefore described) is heated to a temperature of about 250 degrees C. and held at that temperature for approximately two hours with rapid stirring. The oil so obtained has a viscosity of "G" (Gardner-Holdt) and a color of 12 (Gardner-Holdt). A sample of the oil, when mixed with lead and cobalt naphthenates and filmed on a glass plate, as hereinbefore described, dries in about three hours and has a Sward hardness of 4.

(b) The procedure described in (a) above is repeated except that the amount of the ethylethoxysiloxane used is 188.8 grams. The resulting oil has a viscosity of "H" (Gardner-Holdt) and a color of 11 (Gardner-Holdt). The oil film dries in about four hours and has a Sward hardness of 4.

EXAMPLE 10

An organosiloxanol is prepared by the following procedure: Ethyltrichlorosilane (100 grams) is dissolved in a solvent (300 cc. of diethyl ether), and the resulting solution is added slowly (over a period of fifteen minutes, with stirring) to crushed ice (500 grams). The ether layer is separated from the water layer. The water layer is extracted with additional ether (50 cc.). The combined ether extracts are washed with water until neutral to methyl orange indicator, and are then dried over anhydrous sodium sulfate. The dried ether solution contains approximately 45 grams of dissolved ethyl siloxanol.

A partial ester (60 grams of a mixture of linseed diglycerides, prepared as described in the second paragraph of Example 1) is mixed with the ether solution of ethylsiloxanol prepared as described in the preceding paragraph (45 grams). Using the apparatus and procedure described in the second paragraph of Example 1, the mixture is heated to distill off the ether solvent and is then heated to a temperature of about 200 degrees C. and held at that temperature for approximately four hours. The oil so obtained has a viscosity of "Z$_6$" (Gardner-Holdt) and a color of 10 (Gardner-Holdt). A sample of the oil, when mixed with lead and cobalt naphthenates and filmed on a glass plate as hereinbefore described, dries in about four hours. After standing approximately five days at room temperature, the film has a Sward hardness of 6. A similar film dried for two hours at 125 degrees C. has a Sward hardness of 10.

EXAMPLE 11

Using the apparatus described in the second paragraph of Example 5 "Superb" linseed oil (440 grams), pentaerythritol (68 grams), and a catalyst (2 grams of a solution consisting of 5 per cent calcium naphthenate and 95 per cent Varnolene) are heated at a temperature of 260 degrees C. for about fifteen minutes to obtain a mixture of partial esters of pentaerythritol and glycerol with linseed fatty acid.

An organosilanol is prepared and isolated by the following procedure: Cyclohexyltrichlorosilane (220 grams) is dissolved in diethyl ether (780 grams) and this solution is added dropwise to a vigorously stirred slurry (1000 grams of ice and 250 grams of sodium bicarbonate) The ether layer is separated from the water layer, and the precipitated cyclohexylsilane hydrolysis product (40 grams) is filtered from the ether layer. The water layer is then saturated with sodium chloride to precipitate more of the cyclohexylsilane hydrolysis product (140 grams).

A partial ester (63 grams of the partial ester prepared as described in the first paragraph above) is mixed with a silanol (16 grams of the cyclohexylsilanol prepared as described in the preceding paragraph). Using the apparatus described in the second paragraph of Example 1, the mixture is heated at a temperature of 230 degrees C. for about one hour, water being removed by distillation during the heating. The mixture is hazy at first, but becomes clear during the heating. The oil so obtained has a viscosity of "M" (Gardner-Holdt) and a color of 13 (Gardner-Holdt). A sample of the oil, when mixed with lead and cobalt naphthenates and filmed on a glass plate, as hereinbefore described, dries in about five hours. After standing at room temperature for approximately five days, the oil film has a Sward hardness of 6.

EXAMPLE 12

The procedure described in the last paragraph of the preceding example is repeated except that the amount of cyclohexylsilanol used is 54 grams, and the partial ester used is a mixture of linseed diglycerides prepared as described in the second paragraph of Example 1 (616 grams). The oil so obtained has a viscosity of "H" (Gardner-Holdt) and a color of 13 (Gardner-Holdt).

EXAMPLE 13

A varnish embodying the invention is prepared by the following procedure:

(a) A varnish resin is prepared as follows: A mixture of rosin (70 grams), 2,2-diphenylolpropane (5 grams), phenol (5 grams), calcium acetate (0.5 gram) and formalin (10 grams of a solution consisting of 45 per cent formaldehyde and 55 per cent water) is refluxed for four hours. At the end of this period, water is removed by distillation and pentaerythritol (10 grams) is added. The mixture is then heated at a temperature of 180 degrees C. until the acid number is approximately 25 and a few drops of the mixture when pulled from a cooled glass plate form a three-foot string.

An oil of the invention (50 grams of an oil prepared as described in Example 5) is mixed and heated with a varnish resin (25 grams of the resin prepared as described in the preceding paragraph) at a temperature of about 300 degrees C. for one hour. The varnish so obtained is diluted to a concentration of 50 per cent solids with Varnolene, the final product having a viscosity of "D" (Gardner-Holdt). During the heating the oil does not discolor. By comparison, ordinary dehydrated castor oil, when heated with the same resin by the same procedure, darkens considerably.

(b) An oil of the invention (50 grams of oil D, prepared as hereinbefore described) is mixed and heated with a varnish resin (25 grams of the resin prepared as described in (a) above) at temperatures ranging between 300 and 320 degrees C. for eighty minutes. When diluted to 50 per cent solids with Varnolene, the varnish so obtained has a viscosity of "D" (Gardner-Holdt) and a color of 13 (Gardner-Holdt). A film of the varnish dries in four hours and has a Sward hardness of 34. The alkali resistance of the varnish is approximately the same as that of a varnish film prepared from Q-bodied linseed oil by a similar procedure (heating time, forty minutes; viscosity of the final resin after dilution to 50 per cent solids, "D"; color, 15; Sward hardness, 30). An air-dried film of either resin on the outside of a test tube loosens in 30 minutes and dissolves completely in 75 minutes when immersed in 0.5 normal sodium hydroxide.

(c) An oil of the invention (50 grams of an oil prepared as described in Example 3) is mixed and heated with a varnish resin (25 grams of the resin prepared as described in (a) above) at temperatures ranging between 300 and 320 degrees C. for twenty minutes. The varnish so obtained is diluted to a concentration of 50 per cent solids with Varnolene, the final product having a viscosity of "D" (Gardner-Holdt) and a color of 14 (Gardner-Holdt). A sample of the varnish which is filmed on the outside of a test tube and dried in air shows better resistance to alkali than the varnish film prepared from Q-bodied linseed oil as described in (b) above. When the test tube is immersed in 0.5 normal sodium hydroxide, the air-dried film on the outside of the test tube loosens in 75 minutes and dissolves completely in 100 minutes. Another sample of the varnish, when filmed on a test tube, air-dried, and immersed in water at a temperature of 100 degrees C. for two hours, shows only a slight loss of gloss.

EXAMPLE 14

A modified alkyd resin of the invention is prepared by the following procedure:

A partial ester is prepared as follows:

Soya fatty acid (1 mol) and glycerine (1 mol) are mixed in a flask fitted with a condenser and an inlet tube through which a moderate stream of carbon dioxide is passed over the surface of the reaction mixture. The mixture is heated at a temperature of about 235 degrees C. until the acid number of the resulting soya monoglyceride is 2.

A partial ester (360 grams of the soya monoglyceride prepared as described in the preceding paragraph), cyclohexyltributoxysilane (110 grams), and a catalyst (10 grams of a solution consisting of 10 per cent calcium naphthenate and 90 per cent Varnolene) are mixed in the apparatus described in the second paragraph of Example 1. The mixture is heated for about three hours at temperatures ranging between 220 and 250 degrees C., during which time butanol (approximately 75 cc.) is distilled and collected in the receiver. The oil so obtained (90 grams) is mixed with a polycarboxylic acid (29 grams of phthalic anhydride) and, using the same apparatus, the mixture is heated slowly to a temperature of about 150 degrees C. The mixture is then heated more rapidly to a temperature of about 260 degrees C. and held at that temperature for about one hour. Some phthalic acid (about 15 grams) sublimes and is collected in the still head. The reaction mixture is cooled and the sublimed phthalic acid is then returned. The mixture is heated slowly again to a temperature of about 260 degrees C. and is held at that temperature for two hours, to obtain a resin having an acid number of 1.0. Sublimed phthalic acid (8 grams) is recovered from the still head. The alkyd resin product is diluted to a concentration of 60 per cent solids with Varnolene, the diluted product having a viscosity of "B" (Gardner-Holdt) and a color of 9 (Gardner-Holdt). A sample of the alkyd, when mixed with lead and cobalt naphthenates and filmed as hereinbefore described, sets in one hour and dries in about two and one-half hours. After standing one day at room temperature, the film has a Sward hardness of 4. The Sward hardness of a film warmed in an oven at 125 degrees C. for one hour is 12; two hours, 14; and four hours, 24.

EXAMPLE 15

Using the apparatus and procedure described in the second paragraph of Example 1, a soya monoglyceride prepared as described in Example 14 (175 grams) is mixed with 160 grams of a solution consisting of 33 per cent of an ethylchlorosiloxane prepared as described in the first paragraph of Example 8, and 67 per cent of dioxane. The mixture is heated slowly to a temperature of 230 degrees C., dioxane and hydrogen chloride being distilled before the temperature reaches 180 degrees C. The mixture is then held at a temperature of about 230 degrees C. for about four hours. Using the same apparatus, the oil so prepared (86 grams) is mixed with phthalic anhydride (15 grams) and heated at temperatures from 180 to 200 degrees C. for about one hour. The mixture is then cooled, and the sublimed phthalic acid is returned to the flask. The mixture is then heated at about 230 degrees C. for about two hours to obtain an alkyd resin having an acid number of 3. The resin formed by the reaction is diluted to a concentration of 60 per cent solids with Varnolene, the diluted product having a viscosity of "A" (Gardner-Holdt). A sample of the resin, when filmed on the outside of a test tube, air-dried, and immersed in 0.5 normal sodium hydroxide, loosens in 60 minutes and dissolves in 100 minutes. A sample of an alkyd resin—prepared by a procedure that is similar except that: (instead of the ethylchlorosiloxane) ethyl orthosilicate (10.2 grams) is heated with 71 grams of the soya monoglyceride for two hours at about 250 degrees C.; the resulting oil (55 grams) is heated with 7.5 grams of phthalic anhydride at about 150 degrees C. for two hours before cooling and returning sublimed phthalic acid; and the reaction is continued at about 250 degrees C. for two additional hours—upon dilution to 75 per cent solids concentration with Varnolene, has a viscosity of "B" (Gardner-Holdt), and when filmed on a test tube, air-dried, and immersed in 0.5 normal sodium hydroxide, loosens in 10 minutes and dissolves in 20 minutes.

EXAMPLE 16

An oil of the invention is prepared by the following procedure:

A mixture of castor oil (93 grams), linseed oil (132 grams) and a catalyst (3 grams of a solution consisting of 5 per cent calcium naphthenate and 95 per cent Varnolene) is heated for one hour at temperatures ranging between 160 and 200 degrees C., using the apparatus described in the second paragraph of Example 5. The mixture is cooled, and cyclohexyltriethoxysilane (25 grams, prepared as described in the first paragraph of Example 3) is added. The mixture is then heated slowly to about 200 degrees C. and held at that temperature for two hours. The oil so obtained is filtered. The clear oil has a viscosity of "M" (Gardner-Holdt) and a color of 10 (Gardner-Holdt). A sample of the oil, when mixed with lead and cobalt naphthenates and filmed on a glass plate, as hereinbefore described, dries within twenty-four hours.

We claim:

1. An oil formed by reacting under heat a mixture comprising (A) a hydroxyl-containing polyhydric alcohol partial ester, of a 2 to 18 carbon atom fatty acid, containing (1) 0.9 to 2.1 free alcoholic hydroxyl groups per molecule and (2) at least 9 residues of said fatty acid for every 10 of said polyhydric alcohol with (3) at least 90 per cent of its esterified hydroxyl groups being esterified with said fatty acid and (B) a reactive group containing organosilicon substance, selected from the class consisting of hydrocarbon-substituted chlorosilanes and the hydrocarbon-substituted alkoxysilanes and their partial hydrolysis products containing (1) an average of from one-third to three reactive groups per silicon atom and (2) an average of from 0.8 to 1.25 of said said hydrocarbon substituent groups, each containing at least two carbon atoms, attached by carbon-silicon bonds to each silicon atom, and (3) in which at least 75 per cent of its silicon atoms have but a single such hydrocarbon substituent; said reactants (A) and (B) being present in said mixture in proportions to provide from 1 to 1.25 equivalents of said reactive groups per equivalent of hydroxyl in said partial ester.

2. An oil formed by reacting under heat while withdrawing volatile by-products a mixture consisting of (A) a hydroxyl-containing polyhydric alcohol partial ester, of a 2 to 18 carbon atom fatty acid, containing (1) 0.9 to 2.1 free alcoholic hydroxyl groups per molecule and (2) at least 9 residues of said fatty acid for every 10 of said polyhydric alcohol with (3) substantially all its esterified hydroxyl groups esterified only by said fatty acid and (B) a hydrocarbon-substituted alkoxysilane composition having (1) an average of 0.8 to 1.25 hydrocarbon groups, each containing at least two carbon atoms, attached to each silicon atom by carbon-silicon bonds, and (2) in which at least 75% of the silicon atoms have but a single such hydrocarbon substituent, and (3) in which the remaining free silicon valences are attached to alkoxy groups; said reactants (A) and (B) being present in said mixture in proportions to provide 1 to 1.25 equivalents of said alkoxy groups per equivalent of hydroxyl in said partial ester.

3. An oil formed by reacting under heat while withdrawing volatile by-products a mixture consisting of (A) a polyhydric alcohol partial ester, of a 2 to 18 carbon atom fatty acid, containing (1) 0.9 to 2.1 free alcoholic hydroxyl groups per molecule and (2) at least 9 residues of said fatty acid for every 10 of said polyhydric alcohol with (3) substantially all its esterified hydroxyl groups esterified only by said fatty acid and (B) a hydrocarbon-substituted alkoxysiloxane, (1) containing an average of one-third to two alkoxy groups per silicon atom, (2) having an average of 0.8 to 1.25 hydrocarbon groups, each containing at least two carbon atoms, attached to each silicon atom by carbon-silicon bonds, and (3) in which at least 75 per cent of its silicon atoms have but a single such hydrocarbon substituent; said reactants (A) and (B) being present in said mixture in proportions to provide 1 to 1.25 equivalents of said alkoxy groups per equivalent of hydroxyl in said partial ester.

4. An oil as claimed in claim 2 in which the polyhydric alcohol originally contained at least three hydroxyl groups in its molecule and the fatty acid is a drying oil fatty acid.

5. An oil as claimed in claim 3 in which the fatty acid is a drying oil fatty acid and wherein the polyhydric alcohol originally contained at least three hydroxy groups in its molecule.

6. An oil formed by reacting under heat while withdrawing volatile by-products a mixture consisting of (A) a glycerol partial ester, of an unsubstituted higher saturated fatty acid, containing from 0.9 to 2.1 free alcoholic hydroxyl groups and no substantial number of polycarboxylic acid groups and (B) a hydrocarbon-substituted alkoxysiloxane containing (1) an average of one-third to two alkoxy groups per silicon atom, (2) an average of 0.8 to 1.25 of said hydrocarbon substituents, each containing at least two carbon atoms, attached to each silicon atom by carbon-silicon bonds, and (3) no substantial number of silicon atoms having more than one such hydrocarbon substituent; said reactants (A) and (B) being present in said mixture in proportions providing from 1 to 1.25 equivalents of said alkoxy groups per equivalent of hydroxyl in said partial ester.

7. An oil as claimed in claim 3 in which the partial ester is a pentaerythritol partial ester of linseed fatty acid.

8. An oil as claimed in claim 3 in which the alkoxysiloxane is an ethylethoxysiloxane and the partial ester is a pentaerythritol partial ester of linseed fatty acid.

9. An oil formed by reacting under heat a mixture of materials consisting of (A) a vegetable oil glyceride containing an average of from 0.9 to 2.1 alcoholic hydroxy groups per molecule and substantially no polycarboxylic acid groups and (B) a hydrocarbon-substituted alkoxysiloxane containing an average of from one-third to two alkoxy groups per silicon atom, having an average of about one hydrocarbon group, each containing at least two carbon atoms, attached to each silicon atom by carbon-silicon bonds with at least 75 per cent of its silicon atoms having but a single such hydrocarbon group, and being present in said mixture in proportions as to provide from 1 to 1.25 equivalents of alkoxy groups per equivalent of hydroxyl in said vegetable oil glyceride.

10. An oil as claimed in claim 9 in which the vegetable oil glyceride is a linseed diglyceride and the hydrocarbon-substituted alkoxysiloxane is an ethylethoxysiloxane.

11. An oil as claimed in claim 9 in which the vegetable oil glyceride is an alcoholysis product of coconut oil and pentaerythritol and the alkoxysiloxane is an ethylethoxysiloxane.

References Cited in the file of this patent

UNITED STATES PATENTS

| | | |
|---|---|---|
| 2,048,799 | Lawson | July 28, 1936 |
| 2,481,349 | Robie | Sept. 6, 1949 |
| 2,584,351 | Hunter et al. | Feb. 5, 1952 |
| 2,587,295 | Doyle et al. | Feb. 26, 1952 |
| 2,589,243 | Goodwin et al. | Mar. 18, 1952 |